United States Patent [19]

Scott

[11] 4,393,722
[45] Jul. 19, 1983

[54] FLOW MEASURING DEVICE

[76] Inventor: Marvin D. Scott, 701 Morningside Dr., Mineral Wells, Tex. 76067

[21] Appl. No.: 273,741

[22] Filed: Jun. 15, 1981

[51] Int. Cl.³ .............................................. G01F 1/42
[52] U.S. Cl. ..................................... 73/861.61; 138/44
[58] Field of Search ........... 73/861.61, 861.62, 861.58; 138/44, 45, 94.3

[56] References Cited

U.S. PATENT DOCUMENTS

| 1,958,854 | 5/1934 | Kellett | 138/44 |
| 2,242,467 | 5/1941 | Hamer | 138/94.3 |
| 2,585,290 | 2/1952 | Walker | 73/861.61 |
| 3,105,384 | 10/1963 | Hodgeman et al. | 73/861.62 |
| 3,176,723 | 4/1965 | Hodgeman et al. | 138/44 |
| 3,450,164 | 6/1969 | Walker | 138/44 |
| 3,521,487 | 7/1970 | Akeley | 73/861.61 |

Primary Examiner—E. R. Kazenske
Assistant Examiner—John E. Chapman, Jr.
Attorney, Agent, or Firm—Robert W. B. Dickerson

[57] ABSTRACT

A device for measuring fluid flow in a line. The device includes a bored housing, an orifice plate, and carrier therefor, removably positioned in the housing bore, and opposed sleeves removably positioned in the bore to secure the orifice plate. The orifice carrier has a central arcuate cutout portion of greater than 180° in which the orifice plate is removably positioned. Line pressure is utilized to secure the orifice plate carrier and a housing lock plate.

6 Claims, 3 Drawing Figures

FLOW MEASURING DEVICE

BACKGROUND OF THE INVENTION

Measuring devices have long been used to determine the quantity of fluid, either pneumatic or hydraulic, flowing through a product line. Oftentimes such devices position an orifice-containing plate in such line and measure, with pressure gauges, the pressure differential on opposite sides of such plate. The most appropriate references found during a search performed include the following U.S. Pat. Nos.: 1,456,621; 2,585,290; 2,764,891; 3,321,970; 3,450,164; 3,521,487; and 3,822,592.

The main problem heretofore and presently encountered by prior art devices was and is the inability to provide, over a long period of time, a consistantly accurate measurement. Tolerable error was quite large when energy costs were relatively low. Today and in the future, with the value of oil and gas, for example, ever increasing, inaccuracies can be extremely costly to the seller or buyer of such products. Contributing factors to such inaccuracies have been the inability to provide and maintain the close tolerances required in the fluid passageway and in the orifice alignment. Further when prior art devices have been damaged, such as by abrasion, blockage or the like, the entire measuring device has often had to be replaced. It was to overcome such inaccuracies, and the incumbent expense, that the measuring instrument of this invention was developed.

SUMMARY OF THE INVENTION

The invention includes a central body which has a lateral, machined passageway therethrough to receive a pair of like, replaceable sleeve members. These members are axially aligned within the central body and form a combination replaceable bore and seal for an orifice carrier. The orifice carrier is removably positionable within a cut-out portion of said body and seals against the facing ends of the two sleeves. Locking means are provided whereby upstream pressure locks the orifice carrier in place.

DESCRIPTION OF THE INVENTION

Figure 1:
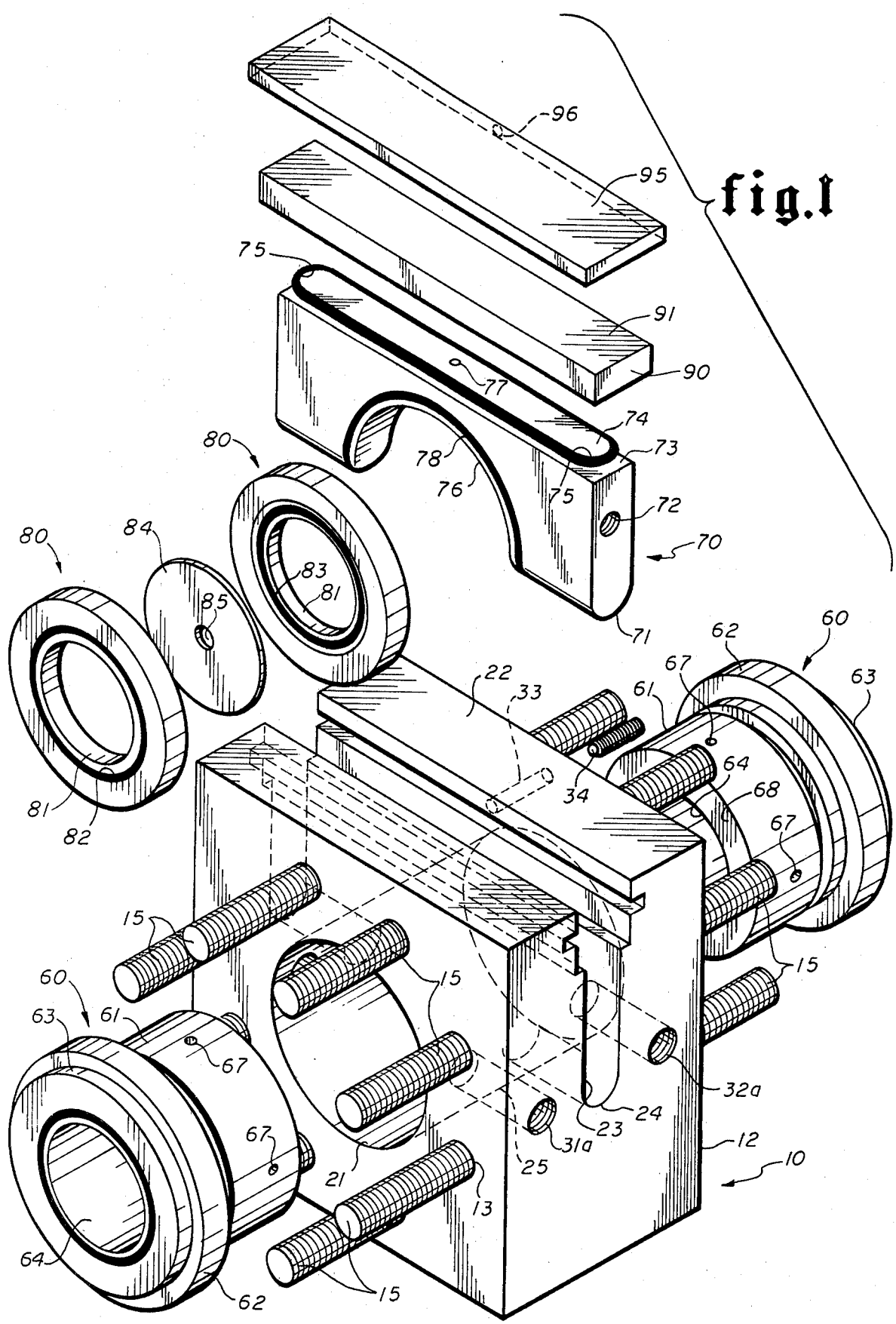
FIG. 1 is an exploded perspective of the device.
Figure 2:
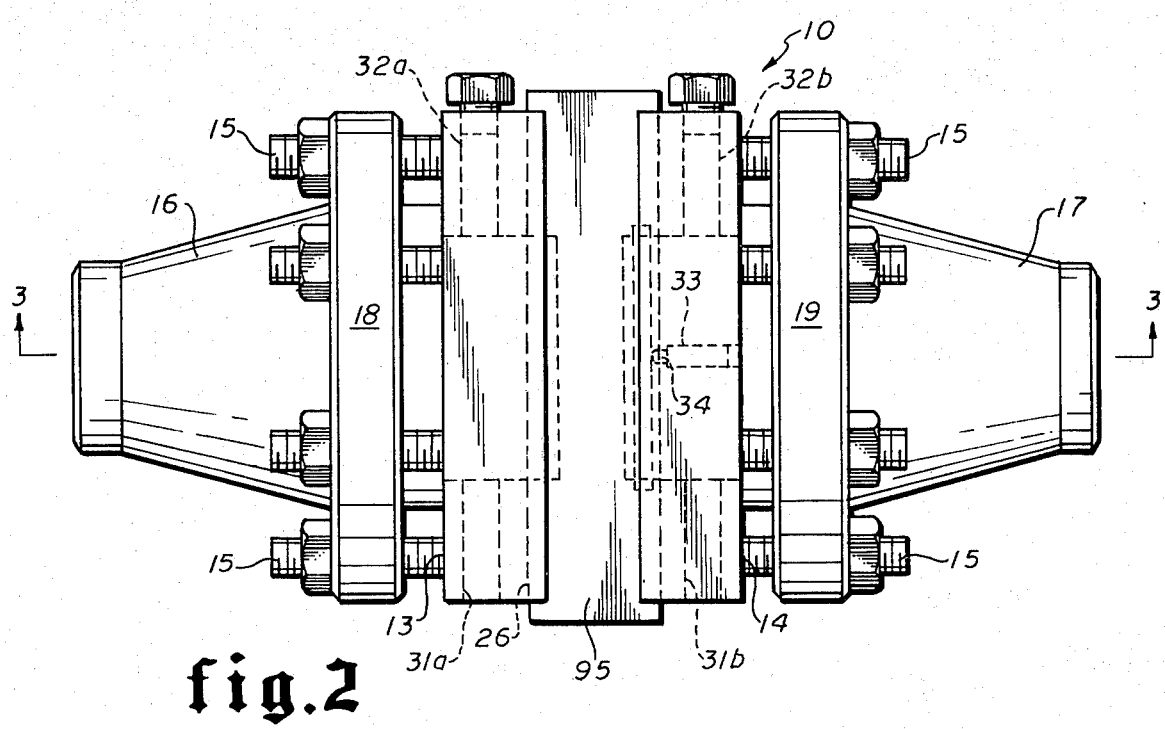
FIG. 2 is a top plan view of the assembled device.
Figure 3:
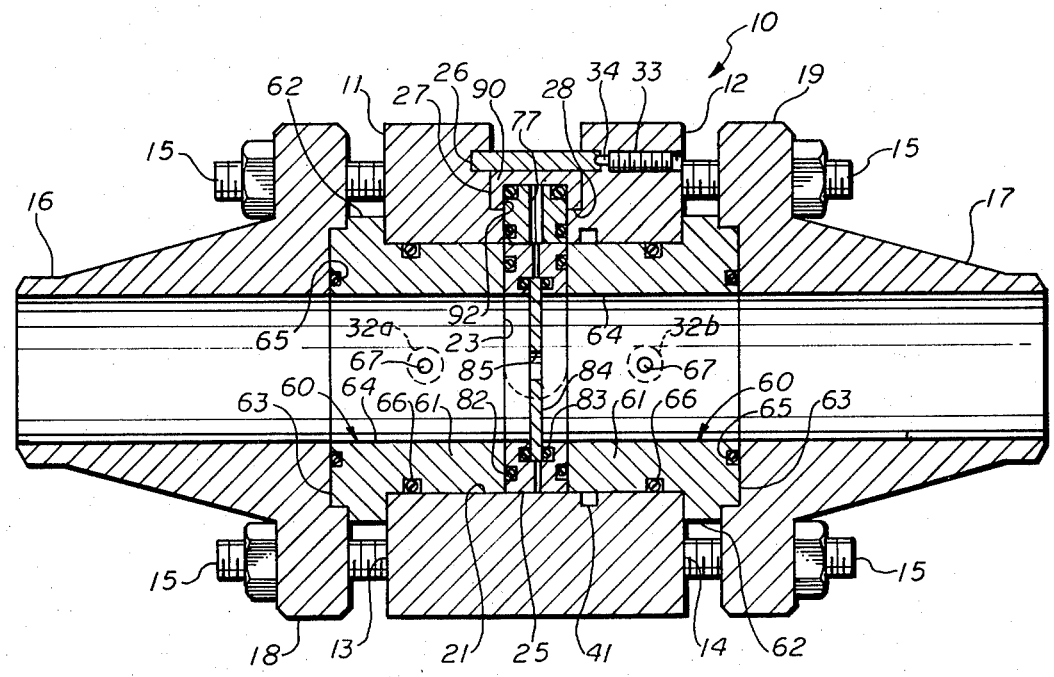
FIG. 3 is a vertical section, taken along lines 3—3 of FIG. 2.

As shown in the drawings, a central housing or body 10 includes on its front and rear faces 11 and 12 a circle of threaded stud holes 13, 14 adapted to receive one end of a plurality of connector bolts 15. Such bolts would serve to link body 10 with flanges 18, 19 of oppositely positioned bore extensions 16, 17. Such bore extensions and the attached device of this invention would be inserted within the throughput line (not shown) for the fluid measuring under consideration. The combination replaceable bore and orifice seal seat unit (sometimes hereinafter referred to as sleeves) described hereinafter would be sealingly clamped between flanges 18, 19 and the opposite faces 11,12 of main body 10, as bolts 15 are tightened. Body 10 also includes an axial bore 21 extending therethrough. The upper surface 22 of body 10 is machined so as to form recess 23 extending laterally across and substantially within said body. The root 24 of said recess is smoothly curved. Approximately central of recess 23, its root 24 is hemispherically machine grooved, as at 25, to receive the orifice carrier and orifice plate hereinafter described. Near upper surface 22 of body 10, recess 23 includes laterally extending counterbores 26 and 27, the former forming an extended groove and the latter forming shoulder 28. On opposite sides of recess 23, bores 31a and 31b and 32a, 32b extend inwardly from the end faces of body 10 to communicate with axial bore 21. One such pair of bores may serve as connections to outside pressure measuring devices or gauges and the other pair for contaminant relief, the latter pair would be plugged during operation. Axially extending detent passageway 33 communicates between body face 12 and groove 26. A spring biased detent 34 would be positioned therein to biasedly engage a lock plate recess, described later herein. Finally, the downstream portion of axial bore 21 would include annular seal-receiving bore 41, for purposes of retaining a pressure differential, ie., preventing downstream leakage from downstream aperture 67 when a seal is positioned in bore 41.

Consider now the replaceable bore and orifice seal seat units (sleeves) generally illustrated by the numeral 60. Inasmuch as such sleeves are duplicates, duplicate numerals are used. Each such sleeve includes an axially extended, cylindrical body 61, annular flange 62 extending therearound near one end, and annular lip 63 depending from flange 63, opposite the main body 61. A smooth, machined bore 64 extends axially through sleeve 60, including all of its principal components 61–63. Lip 63 includes an annular, seal-containing groove 65 in its outer face, circumscribing the entrance to bore 64. Flanges 18, 19 of bore extensions 16, 17, would sealingly engage the seals carried by grooves 65, when bolts 15 clamp the bore extensions to body portion 10. A further seal containing, annular groove 66 encircles sleeve body 61, near its flange 62. When sleeve body 61 is inserted within the axial bore 21 of main body, the seal carried by groove 66 sealingly engages the wall of such bore 21. A lateral aperture 67 extends and laterally communicates between sleeve bore 64, and the exterior of sleeve body 61, for a purpose hereinafter described. When a pair of sleeves 60 each have their body portions 61 fully extended within opposite ends of the axial bore 21 of main body 10, the respective sleeve's flanges 62 will engage opposite faces 11, 12 of body 10. The inner ends 68 of sleeves 60 will each terminate at body groove 25 and engage the orifice carrier hereinafter described.

Consider now the orifice carrier 70. Such carrier fits within main body recess 23, and includes a rounded lower surface 71 which bottoms on recess root 24. Threaded taps 72 laterally extend within the carrier to receive pins (not shown) for lifting the carrier away from body 10. The upper surface 73 has a cylindrical lug extension 74 depending therefrom, such lug extension having rounded ends 75. Carrier 70 further includes a central cutout 76 of slightly greater than 180 degrees to fixedly receive the orifice and orifice rings later described. Fluid passageway 77 communicatingly extends from said cutout portion, through the orifice carrier and lug extension 74. Concentric with cutout 76, the orifice carrier includes seal-receiving groove 78 extending on both faces of the carrier, to receive an O-ring seal. Thus when the orifice carrier is inserted, such O-ring will seal against the walls of body cutout 23.

A pair of orifice seal plates 80 (again duplicate numerals being used), each includes a central bore 81, an annular seal receiving groove 82 circumscribing said bore on the side away from the orifice plate (later described), and a further seal receiving groove 83 on the side facing the orifice plate. Orifice plate 84 may be sized with its orifice 85 in any desired size. The orifice seal plates 80 would have their seal grooves 83 (with seals therein) facing each other, so as to sealingly clamp orifice plate 84 therebetween. The entire assembly, sealplates 80 and orifice plate 84 would be inserted within cut out 76. Inasmuch as the walls of cut out 76 extend more than 180 degrees, such assembly would be restrained from radial movement. End faces 68 of the removable sleeves 60 will seal against the seals carried by grooves 82 of the seal plates 80. Note that upstream line pressure, entering bore 64 of upstream sleeve 60, may exit through aperture 67 and enter the unsealed area between the walls of orifice carrier cutout 76 and the outer edges of seal plates 80, to pass through aperture 77 of orifice carrier 70.

Designed to sealingly fit around lug extension 74 of orifice carrier 70, is a pressure lock cap 90. This cap includes a rectangular body 91 with an elongated undercut 92, designed to receive said lug extensions 74. O-ring seal means would be provided the walls of such undercut area or such seal could be provided lug 74, for sealing engagement. Such lock cap would fit within counter bore 27 of main body 10. Atop lock cap 90, and slidable within counterbore 26 of body 10, is flat, lock plate 95. One side of said lock plate is indented, at 96, to receive the spring biased end of detent 34. Further detent and identification means (not shown) may be provided body 10 and sleeves 60, so as to align apertures 67 and passageways 31, 32.

Consider now the assembly and operation of the device. The removable and replaceable features are especially noteworthy. Initially, the orifice plate 84 would be sealingly positioned intermediate the orifice seal plates 80. The three piece assembly would then be positioned with cutout 76 of the orifice carrier 70. Recall that because of the cutouts configuration, i.e., more than 180 degrees, such orifice plate and seal plates would be restrained from radial movement. The carrier can then be lowered, by pins within taps 72, into recess 23 of body 10. The smooth lower surface 71 of the carrier would fit on root 24 of recess 23 and the seal within groove 78 would engage the body wall around bore 21. The orifice assembly, namely seal plates 80, carrying orifice plate 84 therebetween, would be positioned by groove 25. Lock cap 90 would be inserted within counterbore 27 to sealingly engage lug extension 74 of orifice carrier 70. Lockplate 95 would be inserted within counterbore 26 so that detent 34 engages indentation 96. Bore sleeves 60 would then be inserted through opposite ends of body bore 21 until their flanges 62 engage body faces 11 and 12, and the sleeve ends 68 sealingly engage the seals carried by orifice seal plates 80. At this time, bore extensions 16, 17 would be bolted to body 10 by bolts 15. Line pressure through a line, within which such bore extensions would be inserted, would pass through orifice plate 84. Some upstream line fluid would exit through aperture 67 of the upstream sleeve 60. Some such pressure would exit the unplugged bore 31a. Downstream of the orifice plate, downstream fluid would exit downstream sleeve aperture 67, and unplugged bore 32a. Such fluid exiting bores 31a and 32a would then pass in a conventional manner to a differential pressure measuring device (not shown). Some of the upstream fluid exiting aperture 67 would flow between the walls of orifice carrier cutout 76 and the orifice seal plates, to pass through passageway 77 in the orifice carrier and exert pressure against the surface of undercut 92 of lock cap 90, urging it snugly and sealingly against lock plate 95.

Should one of replaceable sleeves be damaged, it is a simple matter to unbolt one of the bore extensions and replace such sleeve. Should the orifice plate become damaged, then after shutting off pressure, thereby removing the force urging the lock cap against the lock plate, such plate can be released by the detent, the plate removed, and the orifice carrier removed by the lugs fitting within taps 72. After replacing or substituting for the orifice plate the procedure can be reversed to reassemble the device. Not only does this use of component parts allow for closer tolerances in the machining thereof (thereby assuring greater accuracy), but also speedy replacement is facilitated, and, economies are generated. This latter feature is obvious, in that damage to prior art devices usually requires replacement of the entire unit.

Although only a single embodiment has been described, it should be obvious that numerous modifications would be possible by one skilled in the art without departing from the spirit of the invention, the scope of which is limited only by the following claims.

I claim:

1. A fluid measuring device comprising:
housing having a bore therethrough; a pair of spaced fluid passageway means in said housing for permitting fluid to exit said housing for differential pressure measurement; and
removable orifice means removably insertable substantially across said housing bore intermediate said pair of passageway means, said orifice means comprising,
a carrier member having a central arcuate cutout portion of slightly greater than 180 degrees, an orifice plate and centrally apertured seal plates on opposite sides of said orifice plates, all of said plates being carried within said carrier cutout portion whereby said plates are restrained from radial movement.

2. A fluid measuring device, comprising:
housing means having a bore therethrough and a cutaway portion substantially perpendicular to the axis of said bore, said cutaway portion having a rounded root and intersecting said bore;
a pair of substantially identical sleeve members removably and oppositely inserted within opposed ends of said housing bore; orifice means removably positioned within said cutaway portion and intersecting said housing bore, intermediate facing ends of said sleeve members, said orifice means including (a) a carrier having a central arcuate cutout portion of greater than 180 degrees and a lower surface correlative in configuration with said rounded root, (b) an orifice-containing plate having seal plates positioned on opposite sides thereof, all of said plates being carried centrally of said carrier cutout portion, all of said plates having part of their circumferentially extremeties extending outwardly from said cutout portion and removably positioned within a portion of said bore below said cutaway portion; and means for releasably locking said orifice means within said housing cutaway portion.

3. The device of claim 2 wherein said locking means includes fluid aperture means through at least one of said sleeve members and fluid passageway means communicating between said fluid aperture means and said carrier.

4. The device of claim 2 and including means for sealing engagement between each of said facing ends of said sleeves and said orifice means.

5. A fluid measuring device comprising:
a housing having a bore therethrough and a locking plate removably blocking radial access to said bore;
removable orifice means positioned substantially within said housing bore, said orifice means including an orifice plate carrier, an orifice plate carried by said carrier, and a movable orifice plate carrier cover; first fluid passageway means in said housing for permitting fluid on opposite sides of said orifice means to exit said housing for differential pressure measurement; and
means for forcing said cover against said housing locking plate when sufficient fluid pressure exists within said housing, said forcing means includes aperture means through a relatively thin walled portion of said carrier and second fluid passageway means communicating with both said housing bore and said carrier aperture means, whereby said cover may be urged against said housing locking plate.

6. The device of claim 5 and including detent means for releasably securing said locking plate to said housing.

* * * * *